United States Patent
Mizuno et al.

(10) Patent No.: US 9,799,919 B2
(45) Date of Patent: Oct. 24, 2017

(54) IN-SITU MAGNESIUM-METAL GENERATED RECHARGEABLE MAGNESIUM BATTERY

(71) Applicant: TOYOTA MOTOR ENGINEERING & MANUFACTURING NORTH AMERICA, INC., Erlanger, KY (US)

(72) Inventors: Fuminori Mizuno, Ann Arbor, MI (US); Rana Mohtadi, Northville, MI (US); Oscar Tutusaus, Ann Arbor, MI (US); Kensuke Takechi, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 232 days.

(21) Appl. No.: 14/555,792

(22) Filed: Nov. 28, 2014

(65) Prior Publication Data

US 2016/0156063 A1 Jun. 2, 2016

(51) Int. Cl.
*H01M 10/05* (2010.01)
*H01M 10/054* (2010.01)
*H01M 4/04* (2006.01)
*H01M 4/133* (2010.01)
*H01M 4/134* (2010.01)
(Continued)

(52) U.S. Cl.
CPC ....... *H01M 10/054* (2013.01); *H01M 4/0452* (2013.01); *H01M 4/133* (2013.01); *H01M 4/134* (2013.01); *H01M 4/381* (2013.01); *H01M 4/60* (2013.01); *H01M 4/661* (2013.01); *H01M 4/663* (2013.01); *H01M 10/0563* (2013.01); *H01M 10/0567* (2013.01); *H01M 10/0569* (2013.01); *H01M 10/4214* (2013.01); *H01M 2004/027* (2013.01); *H01M 2004/028* (2013.01); *H01M 2220/20* (2013.01)

(58) Field of Classification Search
None
See application file for complete search history.

(56) References Cited

U.S. PATENT DOCUMENTS

| 4,415,636 | A * | 11/1983 | Charkey | H01M 4/244 429/219 |
| 2004/0185334 | A1 * | 9/2004 | Iwamoto | H01M 4/131 429/127 |

(Continued)

OTHER PUBLICATIONS

Ha et al, Magnesium(II) Bis(trifluoromethane sulfonyl) Imide-Based Electrolytes with Wide Electrochemical Windows for Rechargeable Magnesium Batteries, ACS Appl. Mater. Interfaces 2014, 6, 4063-4073.*

(Continued)

*Primary Examiner* — Scott J Chmielecki
(74) *Attorney, Agent, or Firm* — Oblon, McClelland, Maier & Neustadt, L.L.P.

(57) ABSTRACT

A method for production of a magnesium battery with low impedance is provided. A cell is constructed comprising an uncoated current collector anode, an electrolyte system comprising a non-aqueous solvent and a magnesium salt soluble in the non-aqueous solvent, and a cathode. The cell is charged to electrodeposit magnesium metal unto the uncoated current collector to obtain an anode having magnesium metal as the active material. Also provided are rechargeable magnesium batteries obtained by the method.

23 Claims, 18 Drawing Sheets

(51) Int. Cl.
  *H01M 10/0563* (2010.01)
  *H01M 10/0567* (2010.01)
  *H01M 10/0569* (2010.01)
  *H01M 4/38* (2006.01)
  *H01M 4/60* (2006.01)
  *H01M 4/66* (2006.01)
  *H01M 10/42* (2006.01)
  *H01M 4/02* (2006.01)

(56) References Cited

U.S. PATENT DOCUMENTS

| | | | | |
|---|---|---|---|---|
| 2007/0015061 A1* | 1/2007 | Klaassen | ............ | H01M 4/13 429/322 |
| 2013/0034781 A1* | 2/2013 | Khasin | ............ | H01M 2/362 429/405 |
| 2013/0095376 A1* | 4/2013 | Yoshizawa | ............ | C07D 211/94 429/188 |
| 2013/0196236 A1* | 8/2013 | Jung | ............ | H01M 4/0438 429/338 |
| 2014/0349178 A1* | 11/2014 | Mohtadi | ............ | H01M 10/0568 429/200 |
| 2015/0064537 A1* | 3/2015 | Christensen | ............ | H01M 10/0562 429/126 |

OTHER PUBLICATIONS

International Search Report and Written Opinion issued on Feb. 2, 2016 in the International Application No. PCT/US15/58314.

Tyler J. Carter, et al., "Boron Clusters as Highly Stable Magnesium-Battery Electrolytes", Angew, Chem. Int. Ed. 2014, 53, Feb. 12, 2014, pp. 3173-3177.

Se-Young Ha, et al., "Magnesium (II) Bis(trifluoromethane sulfonyl)Imide-Based Electrolytes with Wide Electrochemical Windows for Rechargeable Magnesium Batteries", Appl. Mater. Interfaces 2014, 6, Feb. 21, 2014, pp. 4063-4073.

* cited by examiner

IN-SITU MAGNESIUM-METAL GENERATED RECHARGEABLE MAGNESIUM BATTERY

BACKGROUND OF THE INVENTION

Field of the Invention

This invention is directed to a magnesium electrochemical cell containing a negative electrode having magnesium metal that is formed on a current collector by electrochemical deposition of a magnesium salt electrolyte upon charging the cell. The invention is further directed to a rechargeable magnesium battery constructed by a process wherein an active magnesium anode is prepared by electrodeposition of magnesium metal from a dissolved magnesium electrolyte salt onto a current collector.

Discussion of the Background

Lithium ion batteries have been in commercial use since 1991 and have been conventionally used as power sources for portable electronic devices. The technology associated with the construction and composition of the lithium ion battery (LIB) has been the subject of investigation and improvement and has matured to an extent where a state of art LIB battery is reported to have up to 700 Wh/L of energy density. However, even the most advanced LIB technology is not considered to be viable as a power source capable to meet the demands for a commercial electric vehicle (EV) in the future. For example, for a 300 mile range EV to have a power train equivalent to current conventional internal combustion engine vehicles, an EV battery pack having an energy density of approximately 2000 Wh/L is required. As this energy density is close to the theoretical limit of a lithium ion active material, technologies which can offer battery systems of higher energy density are under investigation.

Magnesium as a multivalent ion is an attractive alternate electrode material to lithium, which can potentially provide very high volumetric energy density. It has a highly negative standard potential of −2.375V vs. RHE, a low equivalent weight of 12.15 g/mole of electrons and a high melting point of 649° C. Compared to lithium, it is easy to handle, machine and dispose. Because of its greater relative abundance, it is lower in cost as a raw material than lithium and magnesium compounds are generally of lower toxicity than lithium compounds. All of these properties coupled with magnesium's reduced sensitivity to air and moisture compared to lithium, combine to make magnesium an attractive alternative to lithium as an anode material.

Magnesium (Mg) batteries are being researched as a candidate for post lithium-ion systems. They are expected to be high energy battery systems, due to the high volumetric capacity made available via the two electron transfer per Mg. Much effort has been devoted to electrolytes and cathodes in order to maximize the advantage of Mg metal as anode and to establish the entire Mg metal battery system. In the electrolyte research, systems showing high oxidation potential, less corrosion and good compatibility with Mg metal have been reported. In this regard, some Grignard-based electrolytes and borohydride-based electrolytes work well as Mg battery electrolyte, while typical organic solvents do not. Additionally, there is much ongoing research and development directed to cathode active materials and the construction of new cathodes showing increasingly higher rechargeability and higher durability at practical rates. Chevrel phase $Mo_6S_8$ has been demonstrated to be a cathode material of good performance with a magnesium anode. Other materials showing potential as cathode actives for a magnesium battery include elemental sulfur, manganese dioxide and vanadium oxide.

However, an ongoing problem with a magnesium anode and construction of a magnesium electrochemical cell is associated with recognition that the magnesium ion is doubly charged and therefore, does not pass through films formed on the electrode surface when magnesium chemically interacts with the electrolyte. Such films impose high impedance to the system, in the range greater than ten thousand ohms and as a result the charge-discharge voltage quickly hits upper and lower cut-off limits, resulting in almost no capacity and no voltage plateau. FIGS. 4 and 5 demonstrate such performance. Thus, magnesium batteries have been prepared under conditions and methods designed to prevent or control this problem. However, until now the problem has remained and a method to prepare and assemble a magnesium electrochemical cell or battery has been needed.

The inventors are directing effort and resources to the study of all aspects of the production of a magnesium battery of sufficient capacity and cycle lifetime to be useful as a power source for utilities requiring a high capacity and high cycle lifetime and have recognized the importance of addressing and solving the problem associated with high impedance film formation in a magnesium battery.

Therefore, an object of the present invention is to provide a method to prepare a magnesium electrochemical cell having low or no impedance due to film formation on the magnesium anode during the construction process.

Another object of the present invention is to provide a rechargeable magnesium battery having high capacity and high cycle lifetime.

SUMMARY OF THE INVENTION

These and other objects have been achieved according to the present invention, the first embodiment of which includes a method to prepare a magnesium battery, comprising: construction of a cell comprising an uncoated current collector anode, an electrolyte system comprising a non-aqueous solvent and a magnesium salt soluble in the non-aqueous solvent, and a cathode; and charging the cell to electrodeposit magnesium metal unto the uncoated current collector to obtain an anode having magnesium metal as the active material.

In another embodiment, the present invention includes a magnesium battery comprising: a negative electrode comprising a current collector having an electrodeposited coating of magnesium metal; a cathode; and an electrolyte system comprising a non-aqueous solvent and a magnesium salt soluble in the non-aqueous solvent; wherein prior to a first charge, the negative electrode current collector is devoid of magnesium metal.

In a further embodiment, the present invention includes a magnesium battery comprising: a negative electrode comprising a current collector and an electrodeposited coating of magnesium metal; a cathode; an electrolyte chamber having an inlet and outlet for addition and removal of electrolyte solution; an electrolyte system comprising a non-aqueous solvent and a magnesium salt soluble in the non-aqueous solvent; wherein prior to a first charge, the negative electrode current collector is devoid of magnesium metal.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DETAILED DESCRIPTION OF THE INVENTION

Figure 1:
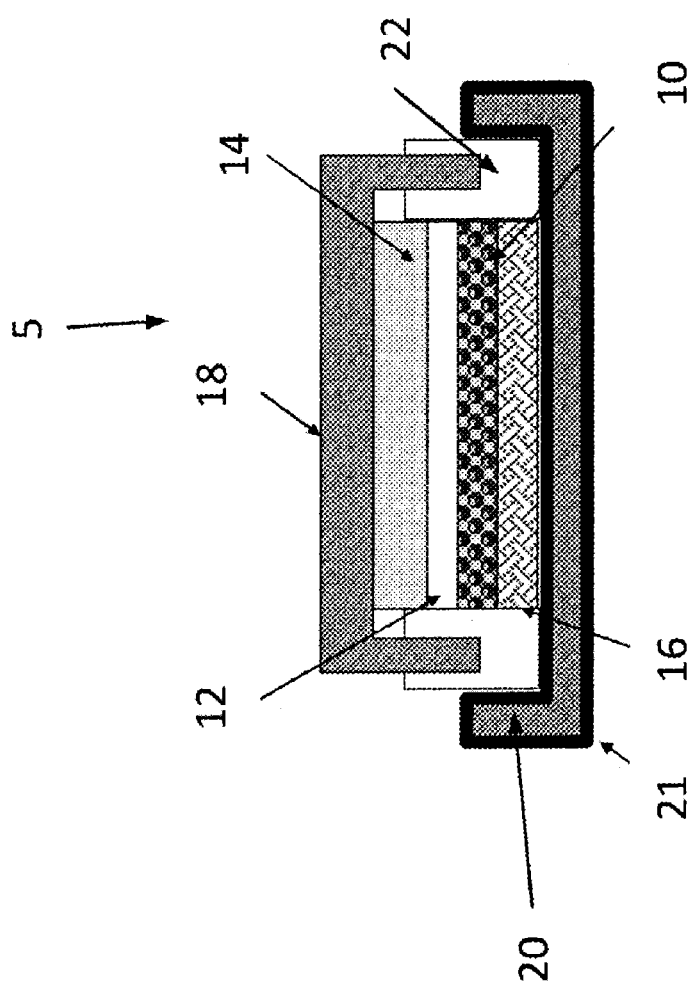
FIG. 1 shows a schematic diagram of a magnesium battery according to one embodiment of the present invention.

Throughout this description all ranges described include all values and sub-ranges therein, unless otherwise specified. Additionally, the indefinite article "a" or "an" carries the meaning of "one or more" throughout the description, unless otherwise specified. The phrases "selected from the group consisting of," "chosen from," and the like include mixtures of the specified materials. Terms such as "contain(s)" and the like are open terms meaning 'including at least' unless otherwise specifically noted.

The terms "electrochemical cell" and "battery" may be employed interchangeably unless the context of the description clearly distinguishes an electrochemical cell from a battery.

The present inventors are conducting a wide scale study and evaluation of materials and methods suitable for the production of a magnesium battery having high capacity and high working potential which may ultimately serve as a power source for an electric vehicle.

As described above, an ongoing problem associated with the construction of a magnesium electrochemical cell is the formation of passivating films on the magnesium anode surface which impedes the transfer of magnesium ions and leads to high impedance and poor performance of the cell.

The inventors have observed the high impedance just after assembling an entire cell comprising Mg metal anode, electrolyte and cathode, and although not wishing to be limited by theory, believe the problem is associated with interfacial impedance between Mg metal anode and the electrolyte due to passivating film formation by chemical reduction of the electrolyte by the magnesium metal. Therefore, in ongoing studies to address this problem the inventors have discovered that when Mg metal is not present in the system upon initial construction and instead, is first generated from an electrolyte containing a high concentration of magnesium ion via deposition of magnesium metal onto a current collector substrate during an initial charging operation, a magnesium battery having low interfacial impedance is obtained.

Advantageous to the method, there is much less anode/electrolyte interface, in comparison to the structure wherein the magnesium anode is directly provided. The inventors have discovered that such in-situ generated Mg metal anode has extremely low impedance, resulting in a battery having significantly improved performance. Such reduction in interfacial impedance due to in situ preparation of the magnesium metal anode was unexpected and leads to production of a magnesium battery having advantages over conventionally prepared systems.

Thus, in a first embodiment, the present invention provides a method to prepare a magnesium battery, comprising: construction of a cell comprising an uncoated current collector anode, an electrolyte system comprising a non-aqueous solvent and a magnesium salt soluble in the non-aqueous solvent, and a cathode; and charging the cell to electrodeposit magnesium metal unto the uncoated current collector to obtain an anode having magnesium metal as the active material.

The current collector substrate may be any suitable material conventionally employed and may be steel, carbon or other metal.

Theoretically an electrolyte having a higher oxidation potential than the cathode redox potential and also having high solvency for magnesium salts may be employed. Thus, Mg may be efficiently electrodeposited upon initial charge and due to high solvency a sufficient content of Mg can be formed on the current collector. Suitable electrolyte systems include Grignard-based electrolytes, for example, PhMgCl—AlCl$_3$/tetrahydrofuran (THF), borohydride-based electrolytes, for example, Mg monocarborane (Mg(CB$_{11}$H$_{12}$)$_2$/tetraglyme (TG) and ionic liquid-based electrolytes, for example, N-methyl-N-propylpiperidinium bis(trifluoromethansulfonyl)imide (PP13TFSI)/magnesium bis(trifluoromethansulfonyl)imide (Mg(TFSI)$_2$). Compatible mixtures of these electrolytes may also be used.

The content of Mg ion available in the electrolyte may be from 0.05 M to 2.0 M, preferably from 0.1 to 1.5 M and most preferably from 0.25 to 1.0 M, although the content of Mg necessary to construct and maintain a battery will depend upon the actual electrolyte system employed and whether the rechargeable battery is closed or has capability for electrolyte exchange or flow-through.

In one preferred embodiment the electrolyte contains a room temperature ionic liquid (RTIL). The ionic liquids suitable may comprise any of cations such as imidazolium cation, piperidinium cation, pyrrolidinium cation, pyridinum cation, ammonium cation and phosphonium cation and any of anions such as bis(trifluoromethansulfonyl)imide anion, bis(fluorosulfonyl)imide anion, tetrafluoroborate anion, hexafluorophosphate anion, dicyanamide anion and a halogen anion (chloride, bromide or iodide). In preferred embodiments the ionic liquid may be N-methyl-N-propylpiperidinium bis(trifluoromethansulfonyl)imide (PP13TFSI) or N,N-Diethyl-N-Methyl-N-(2-methoxyethyl) ammonium bis(trifluoromethansulfonyl)imide (DEMETFSI).

Figure 2:
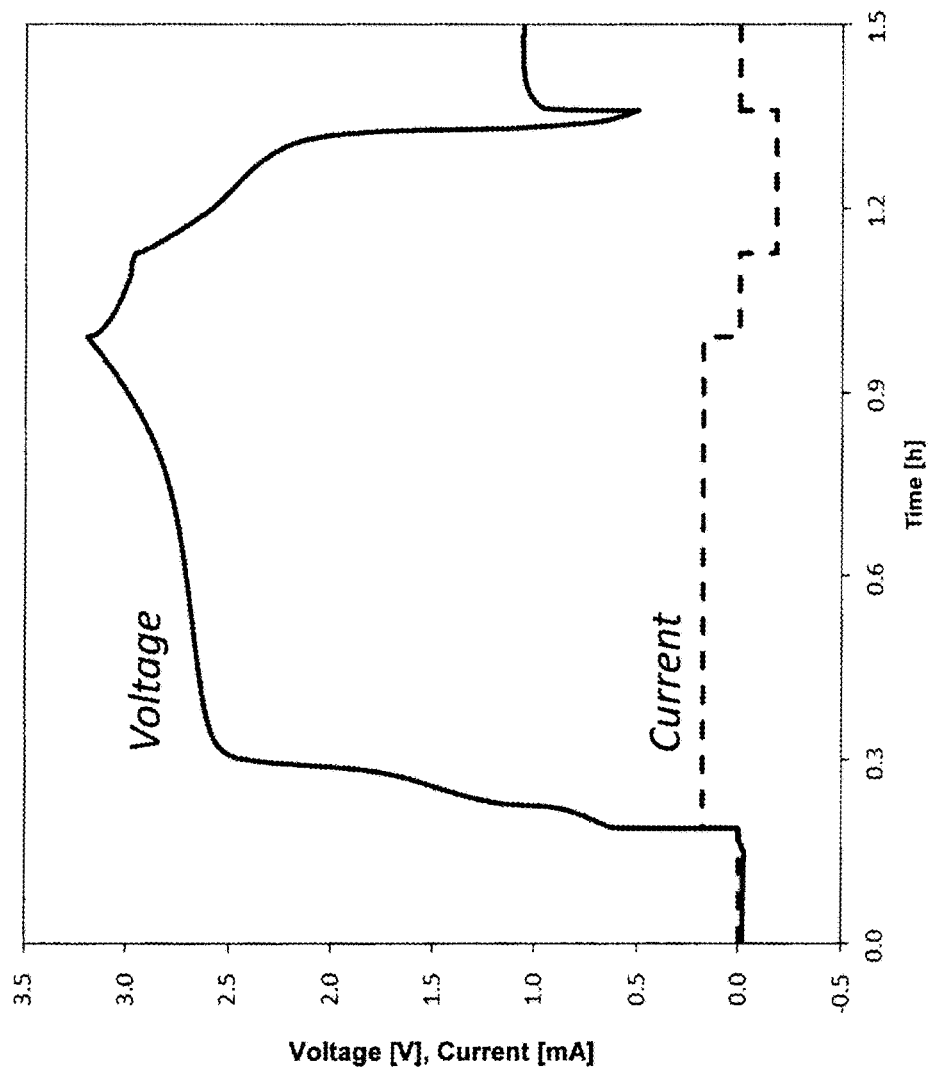
FIG. 2 shows initial charge-discharge voltage and current profiles of the Mg battery with no Mg metal anode as a function of time wherein the electrolyte is PP13TFSI with 0.10 mol/kg $Mg(TFSI)_2$.

Suitable electrolyte systems in accordance with the present invention include borohydride-based electrolytes (FIG. 6/7), Grignard-based electrolytes (FIG. 8/9) and ionic liquid based electrolyte (FIG. 2/3). However, conventional organic solvents coupled with Mg(TFSI)$_2$ are not suitable because such electrolytes passivate the surface of Mg metal and hinder the Mg deposition itself. A key parameter is a capability of the electrolyte's compatibility with Mg metal. Since the Mg metal is generated in-situ and Mg metal is deposited at the anode surface during the charge cycle, compatibility of the electrolyte system with magnesium surface is necessary for successful Mg deposition. Irreversible capacity, low voltage plateau (ca. 1.2V) and relatively high voltage plateau (ca. 3.0V) strongly depend on the kinds of electrolytes. Overall, the borohydride-based electrolytes may be preferred for this invention.

With suitably selected electrolyte systems as according to the present invention high interfacial impedance is successfully hindered and the in situ-formed Mg battery provides significantly and unexpectedly improved performance over conventional magnesium batteries.

A cathode active material which allows for the electrodeposition of magnesium and preferably does not rely on redox capability of a transition metal is preferred. Nitroxyl radical compounds may be employed as a cathode active material. The inventors have discovered that organic compounds such as 2,2,6,6-tetramethylpiperidine 1-oxyl (TEMPO) and optionally substituted derivatives thereof are particularly suitable cathode materials. In one embodiment the cathode may contain TEMPO as an active material. In another embodiment the active material may be 4-methoxy-TEMPO. Mixtures of compatible active materials may also be employed as a cathode active agent.

Other components that may be contained in the cathode include a carbonaceous material such as Ketjen black, acetylene black, vapor grown carbon fiber, graphene, natural graphite, artificial graphite and activated carbon. Other suitable conductive materials may be conductive fibers, such as a metal fiber, metal powder, such as nickel and aluminum, and organic conductive materials, such as a polyphenylene derivative. In some embodiments mixtures of these materials may be employed. Other suitable conductive materials may be conductive ceramics such as titanium nitride and titanium carbide.

Suitable binders for the cathode known to one of ordinary skill which are chemically stable in the potential window of use of the cell may include thermoplastics and thermosetting resins. For example, polyethylene, polypropylene, polytetrafluoroethylene (PTFE), Polyvinylidene fluoride (PVDF), styrene butadiene rubber, a tetrafluoroethylene hexafluoro ethylenic copolymer, a tetrafluoroethylene hexafluoropropylene copolymer (FEP), a tetrafluoroethylene perfluoroalkyl vinyl ether copolymer (PFA), ethylene-tetrafluoroethylene copolymer (ETFE resin), polychlorotrifluoroethylene resin (PCTFE), a propylene-tetrafluoroethylene copolymer, an ethylene-chlorotrifluoroethylene copolymer (ECTFE) and an ethylene-acrylic acid copolymer. These binders may be used independently, or mixtures may be used.

Therefore, in another embodiment, the present invention provides a magnesium battery comprising: a negative electrode comprising a current collector having an electrodeposited coating of magnesium metal; a cathode; and an electrolyte system comprising a non-aqueous solvent and a magnesium salt soluble in the non-aqueous solvent; wherein prior to a first charge, the negative electrode current collector is devoid of magnesium metal.

As indicated above, in order to prepare an anode with sufficient amount of magnesium metal a highly concentrated electrolyte solution containing Mg ion as an anode metal source is installed in the battery and the system charged thus electrodepositing Mg metal. This process may lead to depletion of the Mg ion content of the electrolyte and thus consumption of the electrolyte. Apart from the solubility of TEMPO itself, such consumption may lead to low coulombic efficiency of the system. According to the concept of the invention, the electrolyte becomes an active material fluctuating between Mg metal on the anode and electrolyte ion.

Figure 17:
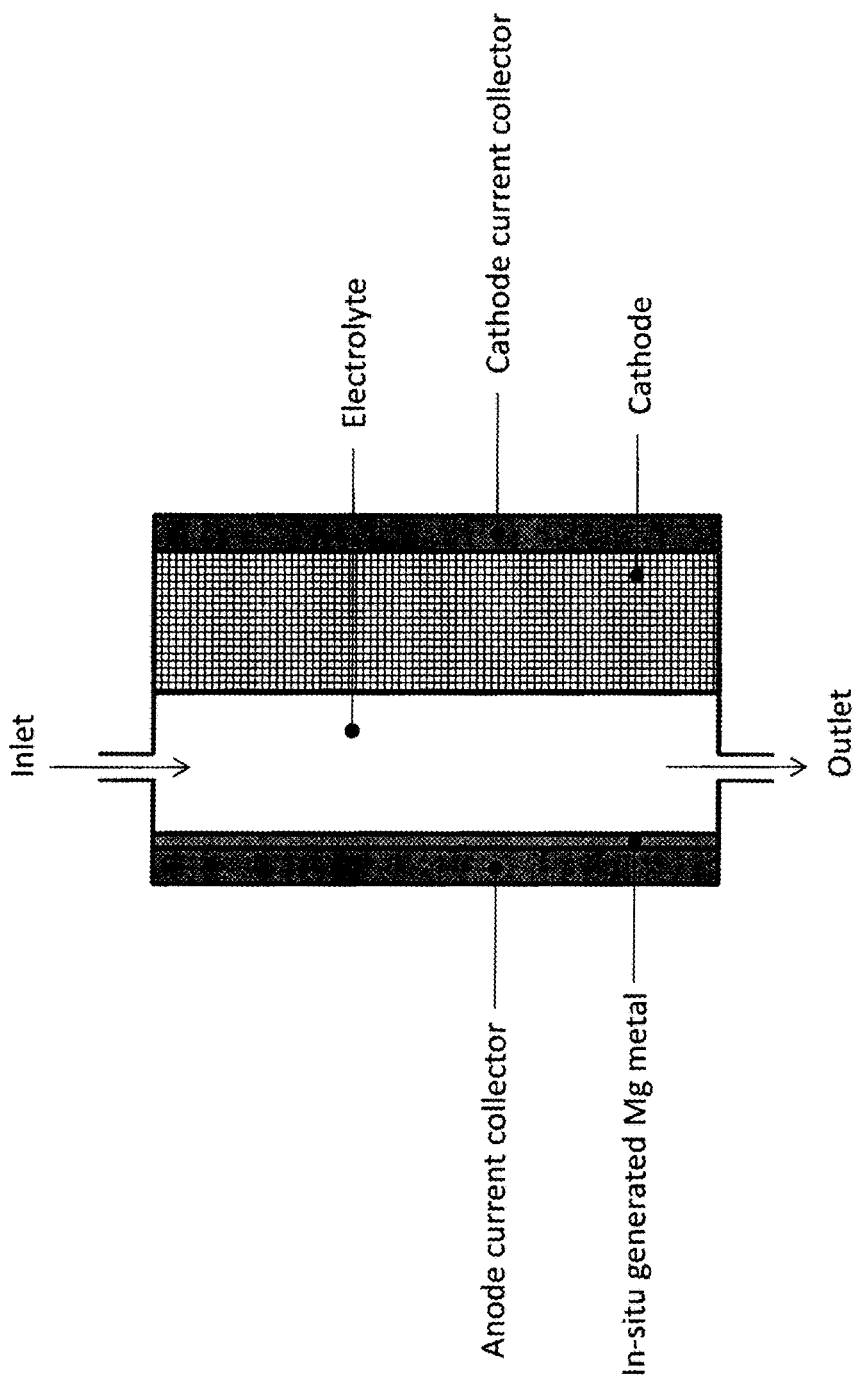
FIG. 17 shows a Mg battery according to one embodiment of the present invention with inlet/outlet ports in the electrolyte compartment.

Therefore, in further embodiments of the invention, the battery may include facility for replacement or rejuvenation of the electrolyte either via a continuous flow system contained with the battery or by provision of a battery structure that readily allows for facile regular exchange of electrolyte. FIG. 17 shows a schematic structure of a battery having a flow structure that provides a mechanism for exchange and rejuvenation of the electrolyte.

In a further embodiment, a new flow type structure where electrolyte itself is supplied like a fuel may be included in the structure of the system.

In a highly advantageous aspect of this invention, since the magnesium metal of the anode is built from the magnesium ion content of the electrolyte, complete discharge of the battery means substantially complete Mg removal from current collector of the anode. Therefore, uncontrolled self-discharge is limited and the safety aspect of the battery is significantly increased.

Thus, in a further embodiment, the present invention provides a magnesium battery comprising: a negative electrode comprising a current collector and an electrodeposited coating of magnesium metal; a cathode; an electrolyte chamber having an inlet and outlet for addition and removal of electrolyte solution; an electrolyte system comprising a non-aqueous solvent and a magnesium salt soluble in the non-aqueous solvent; wherein prior to a first charge, the negative electrode current collector is devoid of magnesium metal.

The electrolyte layer is disposed between the anode and cathode and may include a separator which helps maintain electrical isolation between the positive and negative electrodes. A separator may include fibers, particles, web, porous sheet, or other form of material configured to reduce the risk of physical contact and/or short circuit between the electrodes. The separator may be a unitary element, or may include a plurality of discrete spacer elements such as particles or fibers. The electrolyte layer may include a separator infused with an electrolyte solution. In some examples, for example using a polymer electrolyte, the separator may be omitted.

Magnesium ions in the electrolyte may be present as a salt or complex of magnesium, or as any appropriate form that is suitable as described above.

An electrolyte may include other compounds, for example additives to enhance ionic conductivity, and may in some examples include acidic or basic compounds as additives. An electrolyte may be a liquid, gel, or solid. An electrolyte may be a polymer electrolyte, for example including a plasticized polymer, and may have a polymer infused with or otherwise including magnesium ions. The cathode active material may be present as a sheet, ribbon, particles, or other physical form. An electrode containing the cathode active material may be supported by a current collector.

The current collector may include a metal or other electrically conducting sheet on which the electrode is supported. The current collector may be formed of carbon, carbon paper, carbon cloth or a metal or noble metal mesh or foil. Preferred current collectors may be any of carbon, stainless steel, nickel, aluminum and copper. In certain embodiments the current collector may comprise a protective coating of an oxidation-resistant metal or alloy to protect the collector from oxidation.

FIG. 1 shows an example of one configuration of a rechargeable magnesium cell 5. The cell 5 includes a positive electrode 10 comprising a cathode active material, an electrolyte layer 12, a negative electrode 14, a cathode current collector 16, a negative electrode housing 18, a positive electrode housing 20 including an inert layer 21, and a sealing gasket 22. The electrolyte layer 16 may include a separator soaked in electrolyte solution, and the positive electrode 10 may be supported by the cathode current collector 16. In this example, the negative electrode 14 includes an active material of magnesium metal.

Having generally described this invention, a further understanding can be obtained by reference to certain specific examples which are provided herein for purposes of illustration only and are not intended to be limiting unless otherwise specified.

EXAMPLES

Battery Set Up

A series of batteries as represented in FIG. 1 were prepared using the following materials:

Cathode current collector: Glassy carbon dish
Cathode: 4MeO-TEMPO:KB:PTFE (4:5:1) (wt %) self-standing sheet
Electrolyte: described individually below, with glass microfiber filter separator
Anode: either none or Mg metal as described below
Anode current collector: carbon paper and stainless steel plate
Operation cycle: Charge (0.1 mA/cm² up to 3.2V)→Rest (10 min @ OCV)
Discharge (0.1 mA/cm² down to 0.5V)→Rest (10 min @ OCV)
Test Battery 1 (prepared according to the invention)
Electrolyte: PP13TFSI with 0.10 mol/kg Mg(TFSI)$_2$.

FIG. 2 shows the Initial charge-discharge voltage and current profiles obtained with Test Battery 1 as a function of time.

Figure 3:
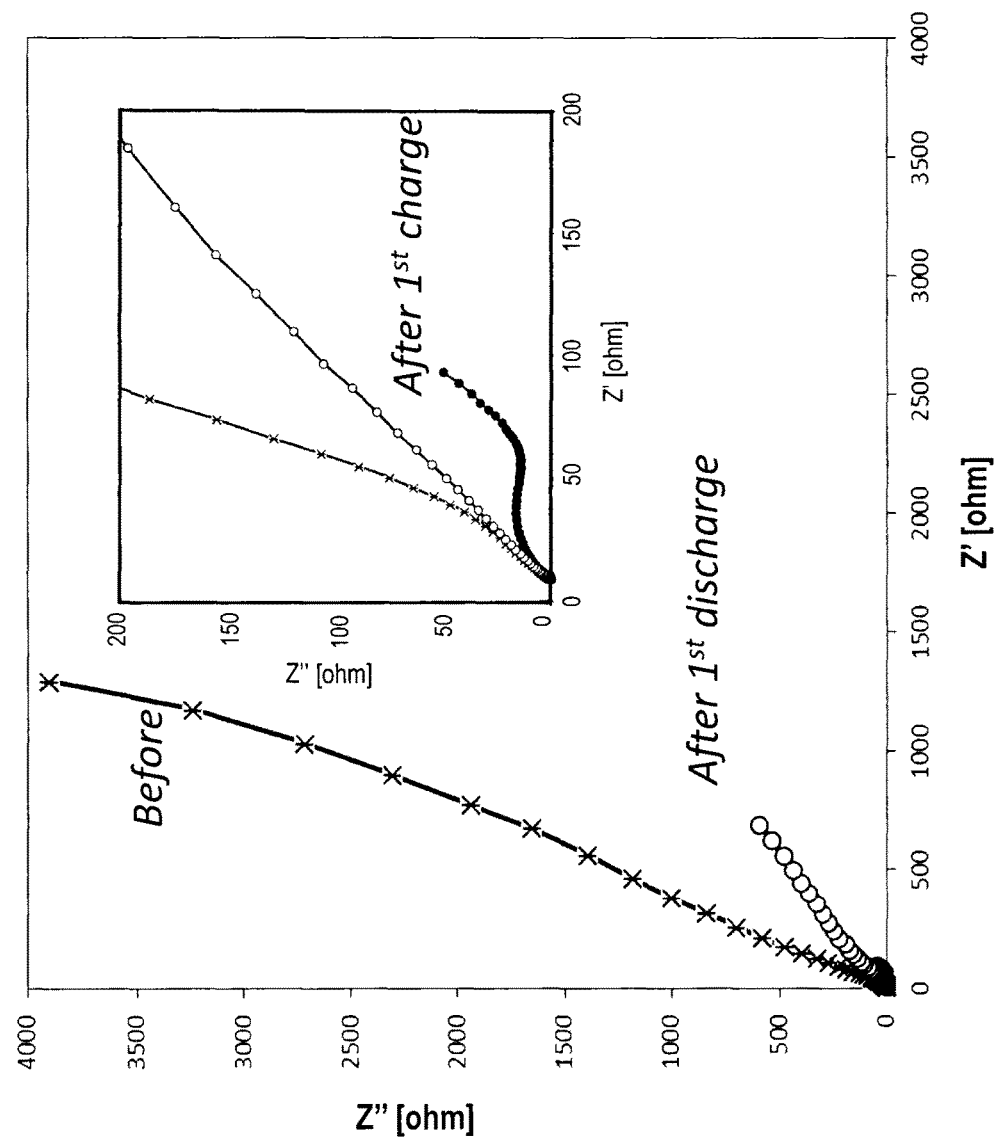
FIG. 3 shows Nyquist plots of the Mg battery with no Mg metal anode before testing, after initial charging and subsequent discharging wherein the electrolyte is PP13TFSI with 0.10 mol/kg Mg(TFSI)2.

FIG. 3 shows Nyquist plots of Test battery 1 before testing, after initial charging and subsequent discharging.

Test Battery 2 (conventional Mg electrode)
Electrolyte: PP13TFSI with 0.10 mol/kg Mg(TFSI)$_2$.

Figure 4:
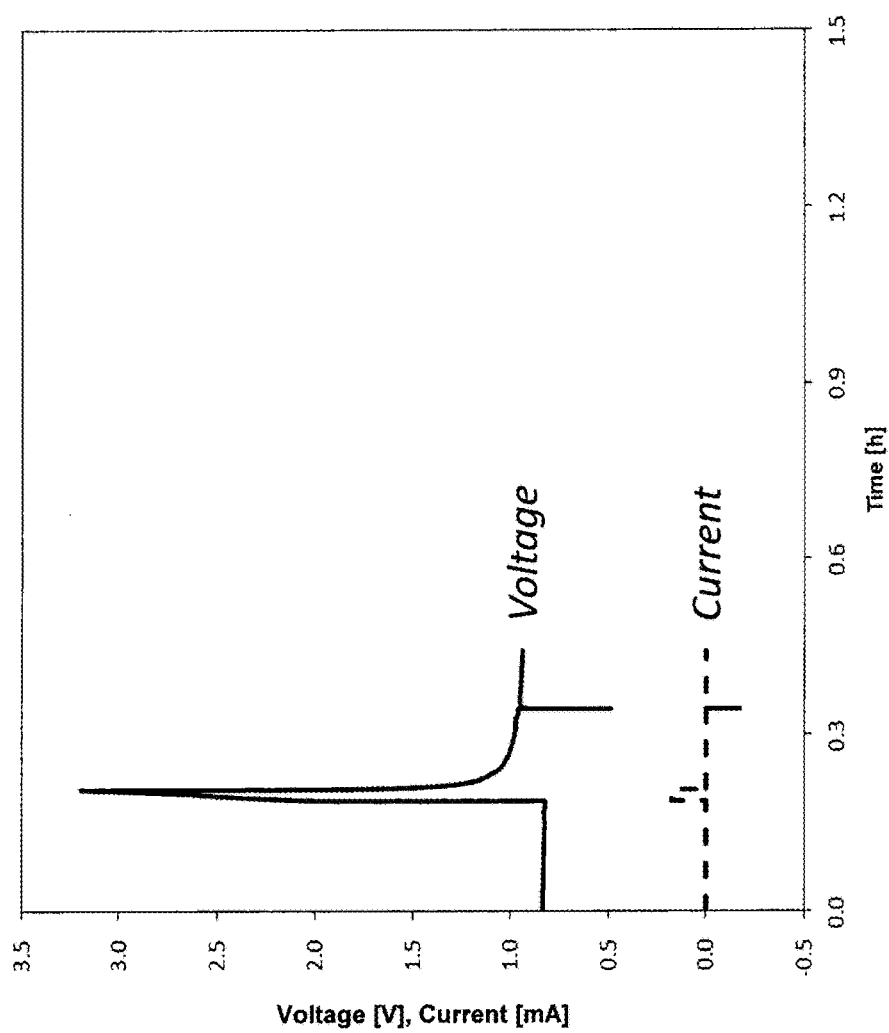
FIG. 4 shows initial charge-discharge voltage and current profiles as a function of time of a Mg battery conventionally constructed with Mg metal anode wherein the electrolyte is PP13TFSI with 0.10 mol/kg $Mg(TFSI)_2$.

FIG. 4 shows the Initial charge-discharge voltage and current profiles of Test Battery 2 as a function of time.

Figure 5:
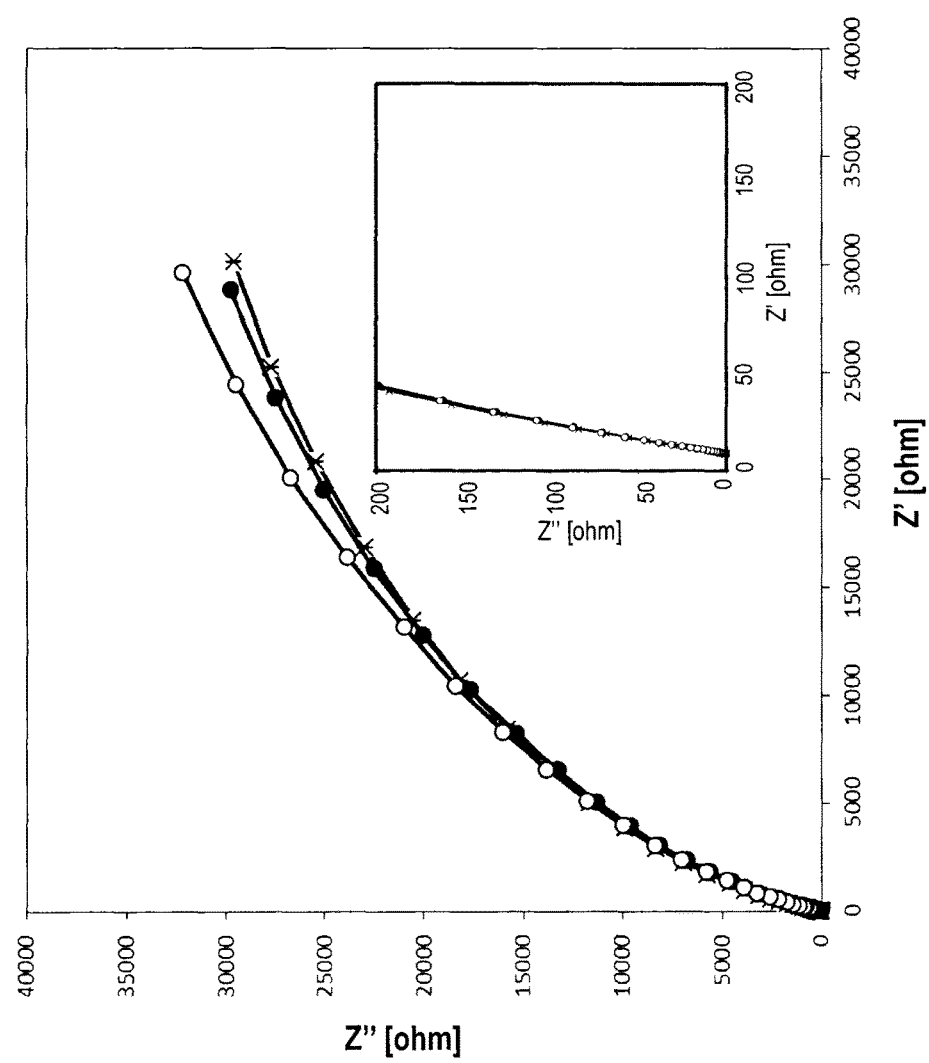
FIG. 5 shows Nyquist plots of a conventional Mg battery with Mg metal anode before testing, after initial charging and subsequent discharging wherein the electrolyte is PP13TFSI with 0.10 mol/kg $Mg(TFSI)_2$.

FIG. 5 shows Nyquist plots of the Test battery 2 before testing, after initial charging and subsequent discharging.

When the Mg metal anode was installed in the construction of the battery according to conventional method, high interfacial impedance was clearly observed before testing as shown in FIG. 5. As a result, IN FIG. 4, it was difficult to charge and discharge the Test battery 2. In comparison in Test battery 1 the Mg anode was formed in situ during charging. The impedance before testing looked like a spike, indicating that no impedance component at the anode/electrolyte interface existed. During charging, the impedance was drastically decreased, while it went back during discharging. This is evidence that the Mg deposition and removal was successfully done. Also the working voltage shown in FIG. 2 was consistent with the TEMPO redox reaction against Mg (theoretically 2.7V vs. Mg). It was, therefore, determined that in-situ generated Mg metal preparation and its self-formation of Mg battery functioned very well.

Test Battery 3 (prepared according to the invention)
Electrolyte: 0.75M Mg carborane in TG.

Figure 6:
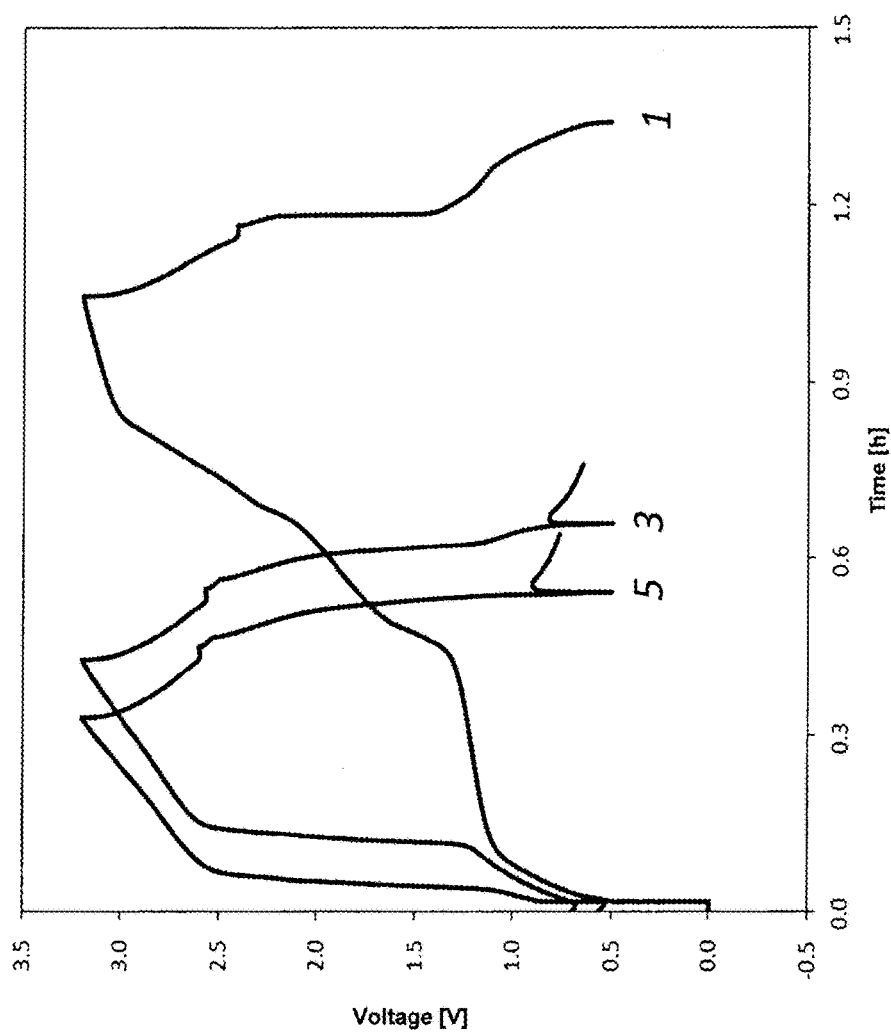
FIG. 6 shows $1^{st}$, $3^{rd}$ and $5^{th}$ charge-discharge voltage profiles as a function of time of a Mg battery according to one embodiment of the present invention. The electrolyte is 0.75M Mg monocarborane in TG.

FIG. 6 shows the 1$^{st}$, 3$^{rd}$ and 5$^{th}$ charge-discharge voltage profiles of Test battery 3 obtained as a function of time.

Figure 7:
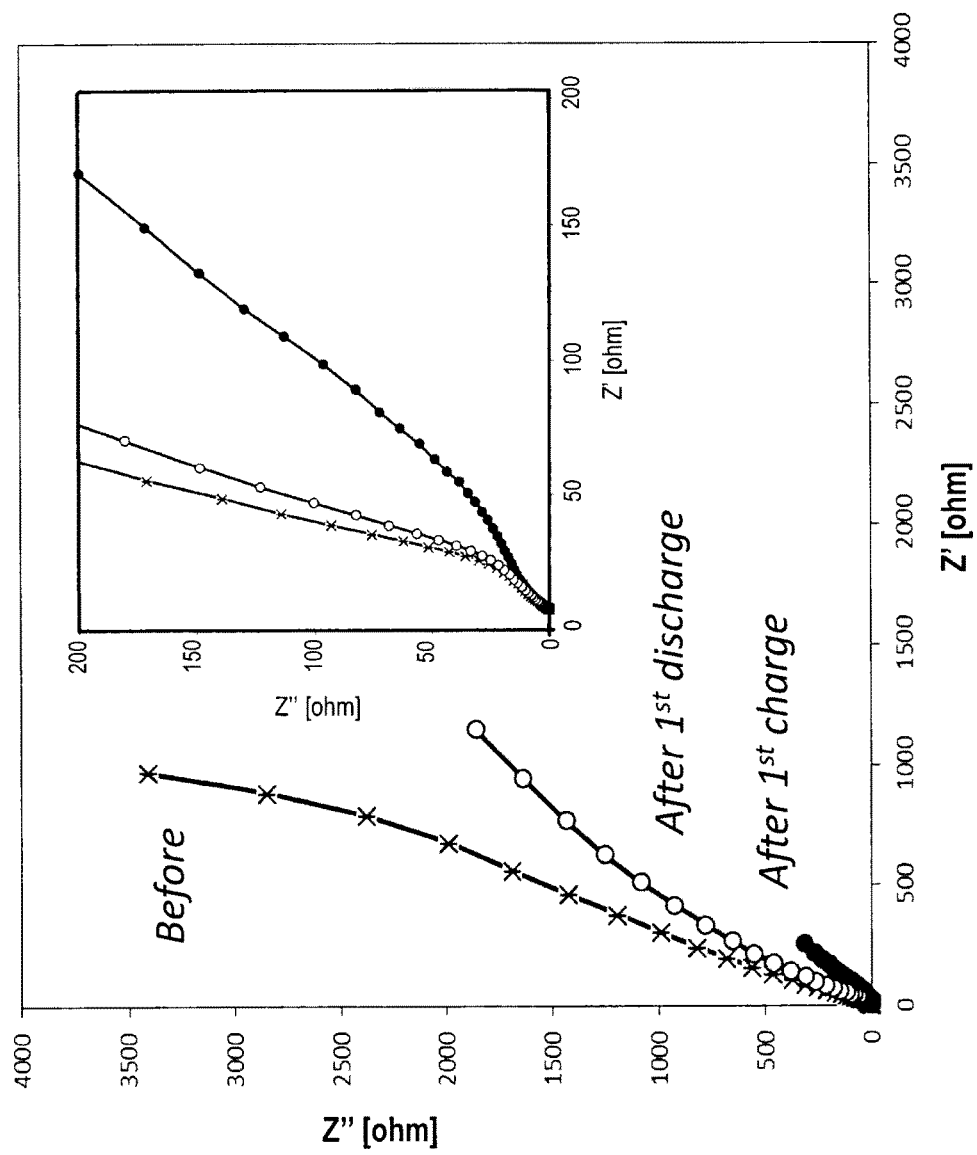
FIG. 7 shows Nyquist plots of a Mg battery according to one embodiment of the present invention before testing, after initial charging and subsequent discharging. The electrolyte is 0.75M Mg carborane in TG.

FIG. 7 shows Nyquist plots of the Test battery 3 before testing, after initial charging and initial discharging.

Test Battery 4 (prepared according to the invention)
Electrolyte: 0.2M PhMgCl—AlCl3 in THF.

Figure 8A:
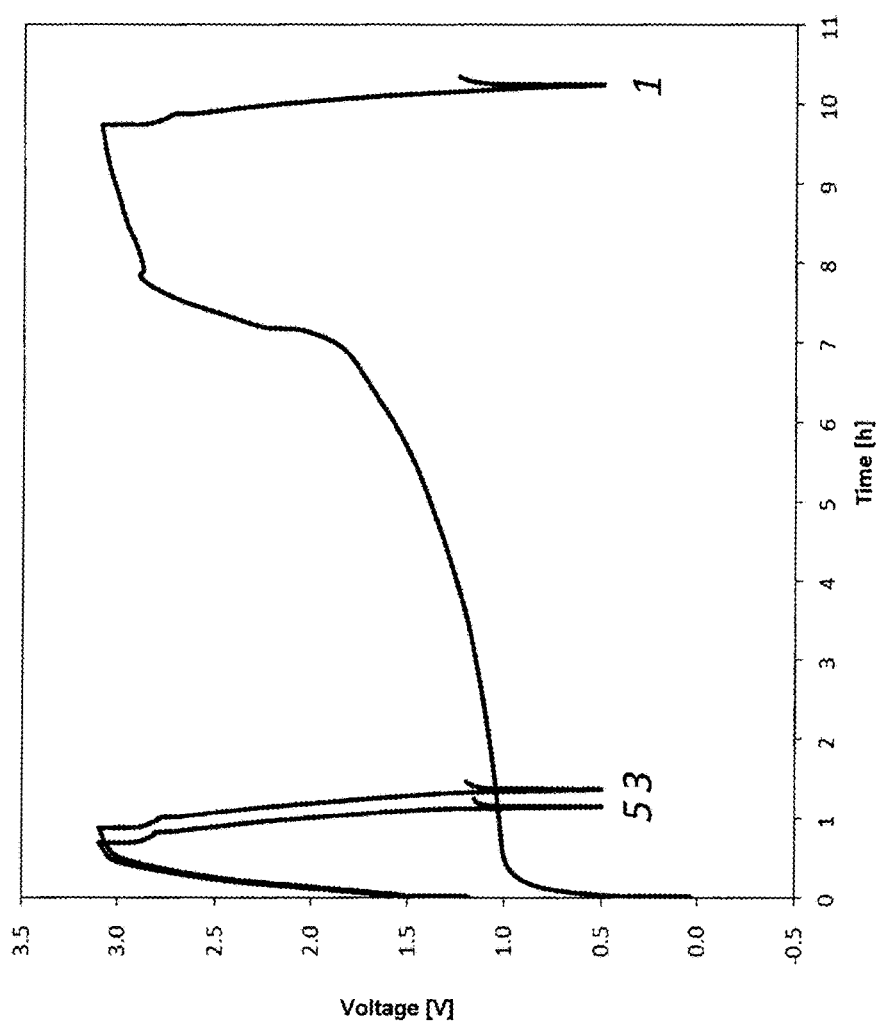
FIG. 8A shows $1^{st}$, $3^{rd}$ and $5^{th}$ charge-discharge voltage profiles of a Mg battery according to one embodiment of the present invention as a function of time. The electrolyte is 0.2M $PhMgCl—AlCl_3$ in THF.

FIG. 8A shows the 1$^{st}$, 3$^{rd}$ and 5$^{th}$ charge-discharge voltage profiles of Test battery 4 as a function of time.

Figure 8B:
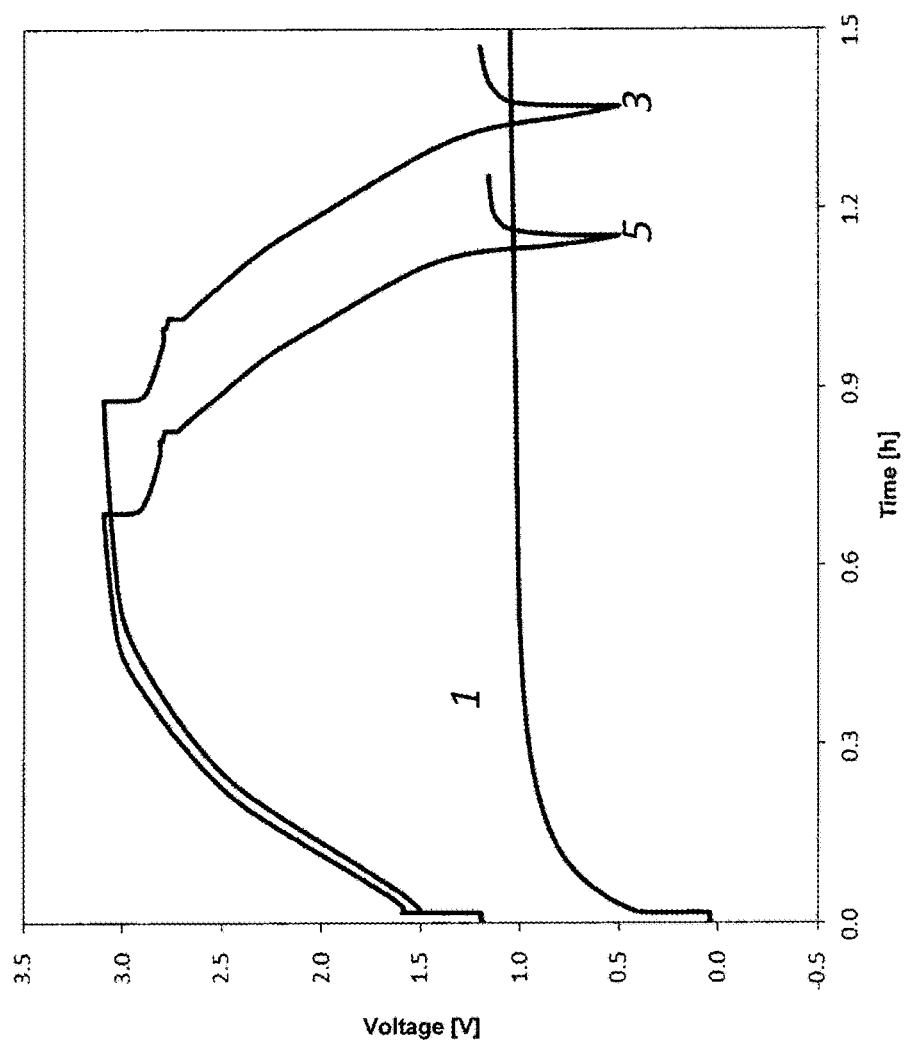
FIG. 8B shows $1^{st}$, $3^{rd}$ and $5^{th}$ charge-discharge voltage profiles of a Mg battery according to one embodiment of the present invention as a function of time. The electrolyte is 0.2M $PhMgCl—AlCl_3$ in THF.

FIG. 8B shows the 1$^{st}$, 3$^{rd}$ and 5$^{th}$ charge-discharge voltage profiles of Test battery 4 as a function of time.

Figure 9:
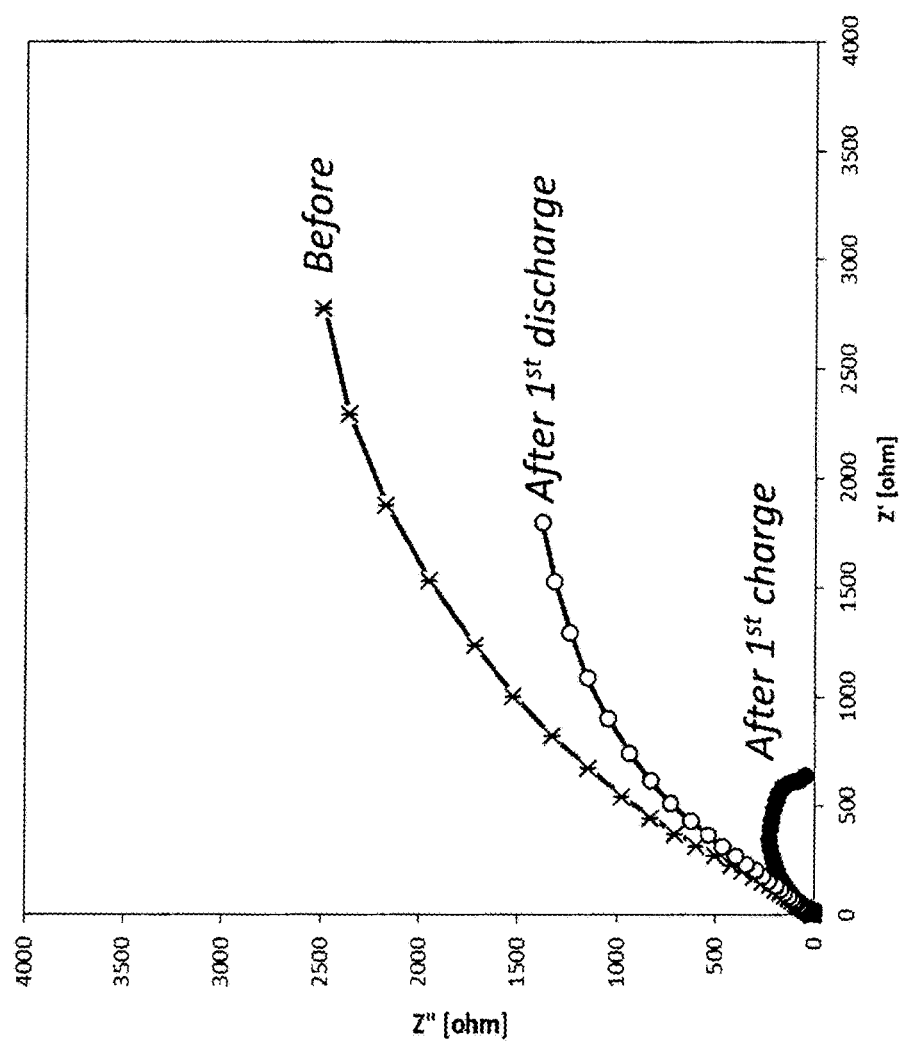
FIG. 9 shows Nyquist plots of a Mg battery according to one embodiment of the present invention before testing, after initial charging and initial discharging. The electrolyte is 0.2M $PhMgCl—AlCl_3$ in THF.

FIG. 9 shows Nyquist plots of Test battery 4 before testing, after initial charging and subsequent discharging.

Figure 10:
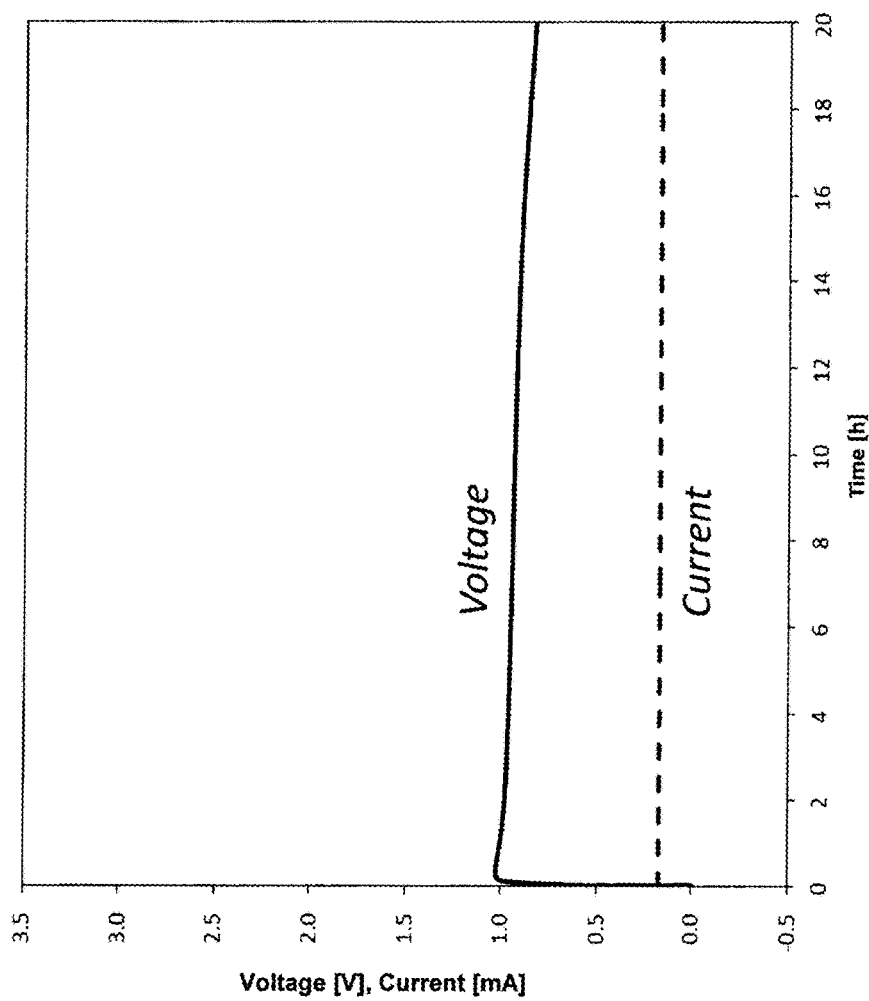
FIG. 10 shows initial charge voltage and current profiles of a Mg battery according to one embodiment of the present invention as a function of time. The electrolyte is 0.5 mol/kg $Mg(TFSI)_2$ in ACN.

Test Battery 5 (prepared according to the invention)
Electrolyte: 0.5 mol/kg Mg(TFSI)$_2$ in ACN FIG. 10 shows the initial charge voltage and current profiles of Test Battery 5 as a function of time.

Figure 11:
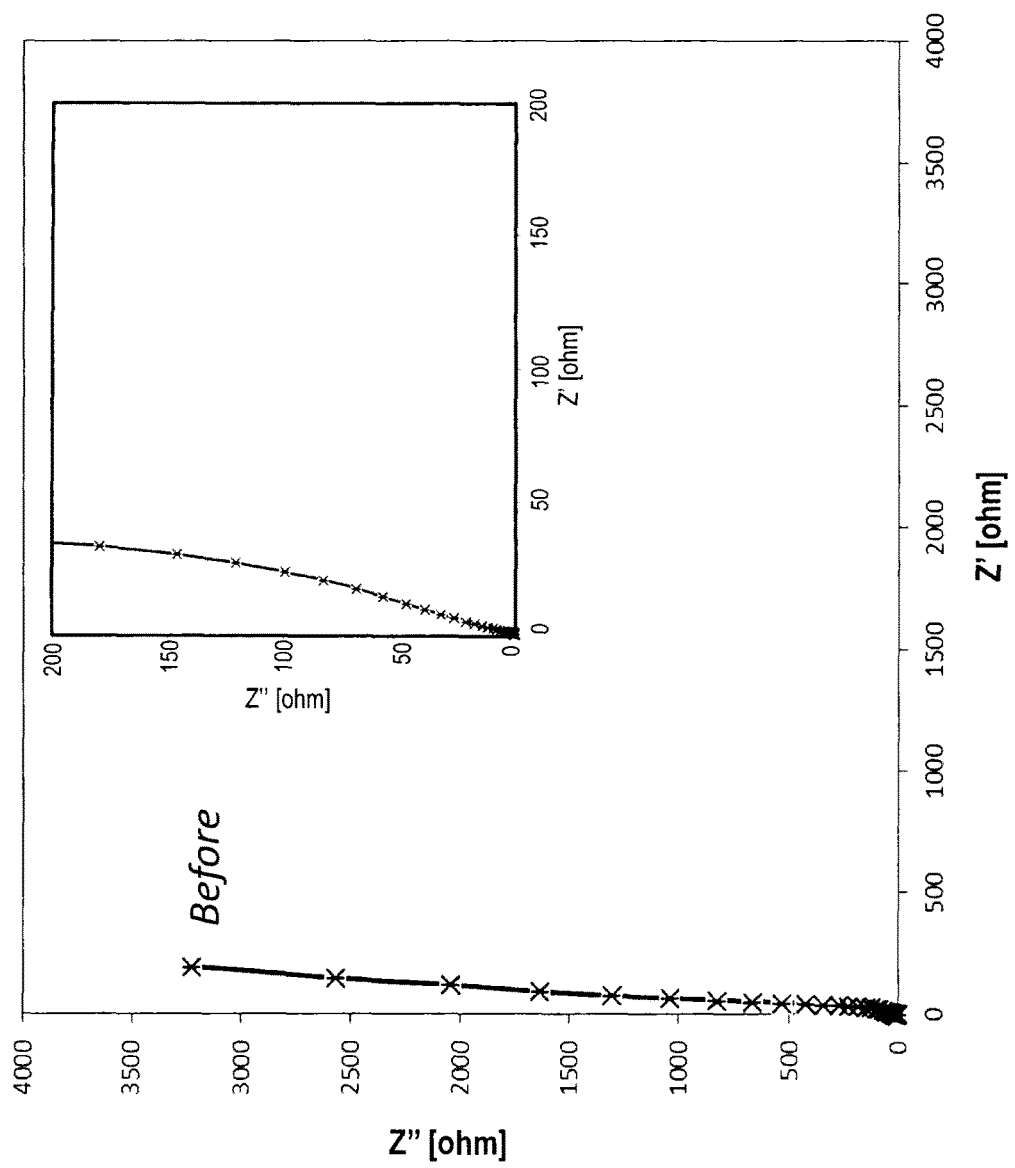
FIG. 11 shows Nyquist plots of a Mg battery according to one embodiment of the present invention before testing. The electrolyte is 0.5 mol/kg $Mg(TFSI)_2$ in ACN.

FIG. 11 shows Nyquist plots of Test Battery 5 before testing.

As indicated by Test batteries 1, 3, 4 and 5 the present invention can be applied in a variety of electrolyte systems. For example, Borohydride-based electrolyte (FIG. 6/7), Grignard-based electrolyte (FIG. 8/9) and Ionic liquid based electrolyte (FIG. 2/3). However, conventional organic solvents coupled with Mg(TFSI)$_2$ were not successful. The inventors believe that this kind of electrolyte passivates the surface of Mg metal, hindering the Mg deposition itself. A key parameter is a capability of the electrolyte's compatibility with Mg metal. Mg metal is not necessary in advance, but during in-situ generation, Mg was certainly deposited at the anode surface. At that time, the compatibility was a very sensitive parameter to determine the successful Mg deposition. Obtaining irreversible capacity, low voltage plateau (ca. 1.2V) and relatively high voltage plateau (ca. 3.0V) depended on the electrolyte composition employed. Overall, the borohydride-based electrolytes appeared to be preferable for performance according to the present invention.

Figure 12:
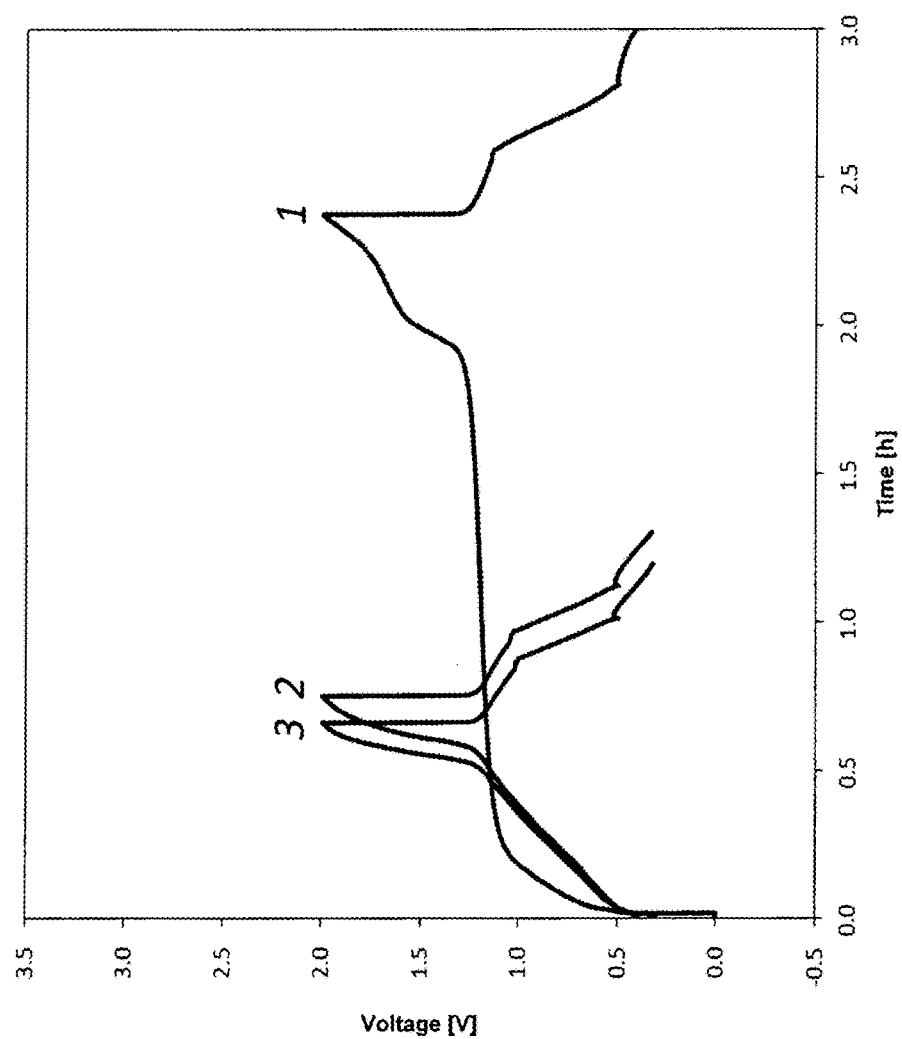
FIG. 12 shows the first three formation cycles of a Mg battery according to one embodiment of the present invention as a function of time. The electrolyte is 0.75M Mg monocarborane in TG.

Test Battery 6 (prepared according to the invention)
Electrolyte: 0.75M Mg monocarborane in TG FIG. 12 shows the first three formation cycles of Test Battery 6 as a function of time.

Figure 13:
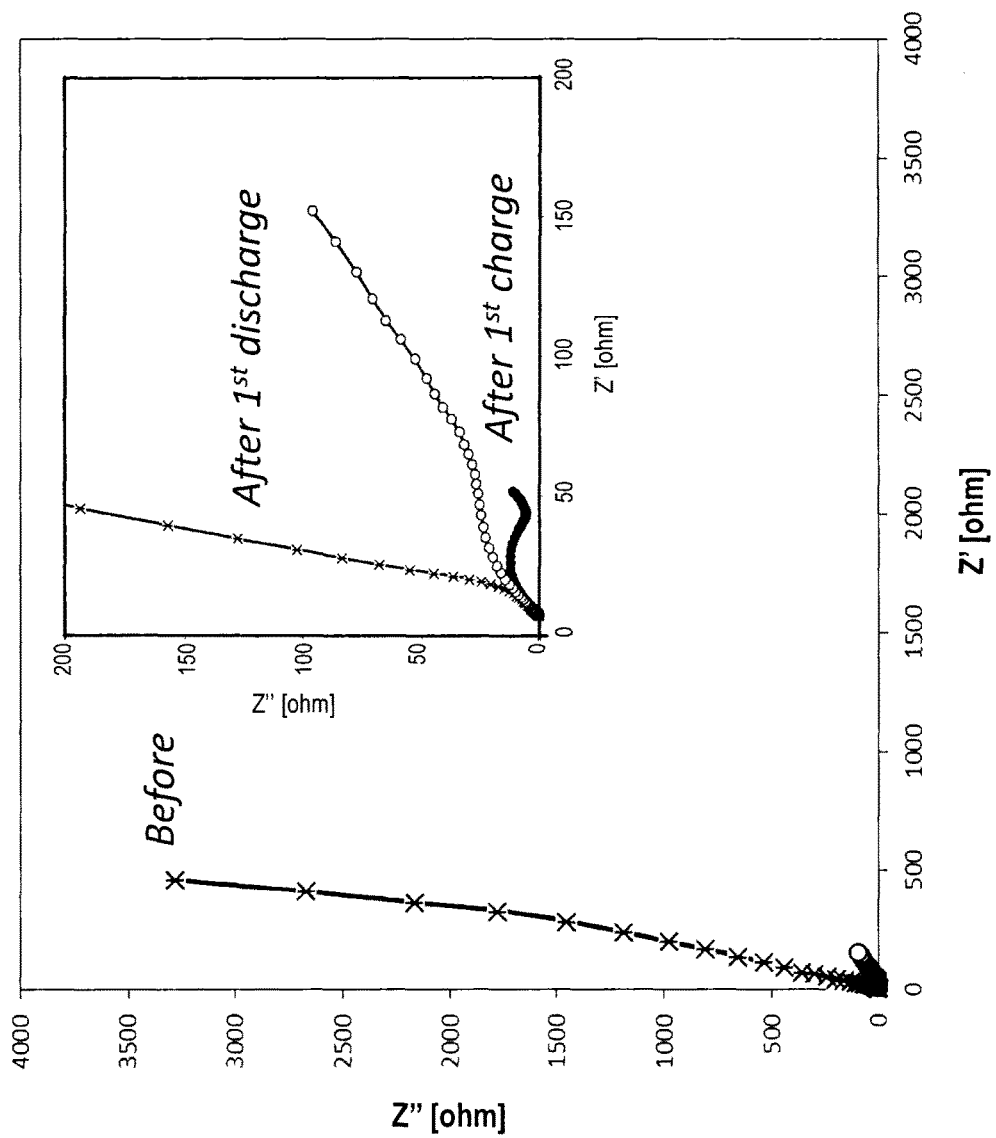
FIG. 13 shows Nyquist plots of a Mg battery according to one embodiment of the present invention before testing, after initial charging and subsequent discharging. The electrolyte is 0.75M Mg monocarborane in TG.

FIG. 13 shows Nyquist plots of Test Battery 6 before testing, after initial charging and subsequent discharging.

Figure 14:
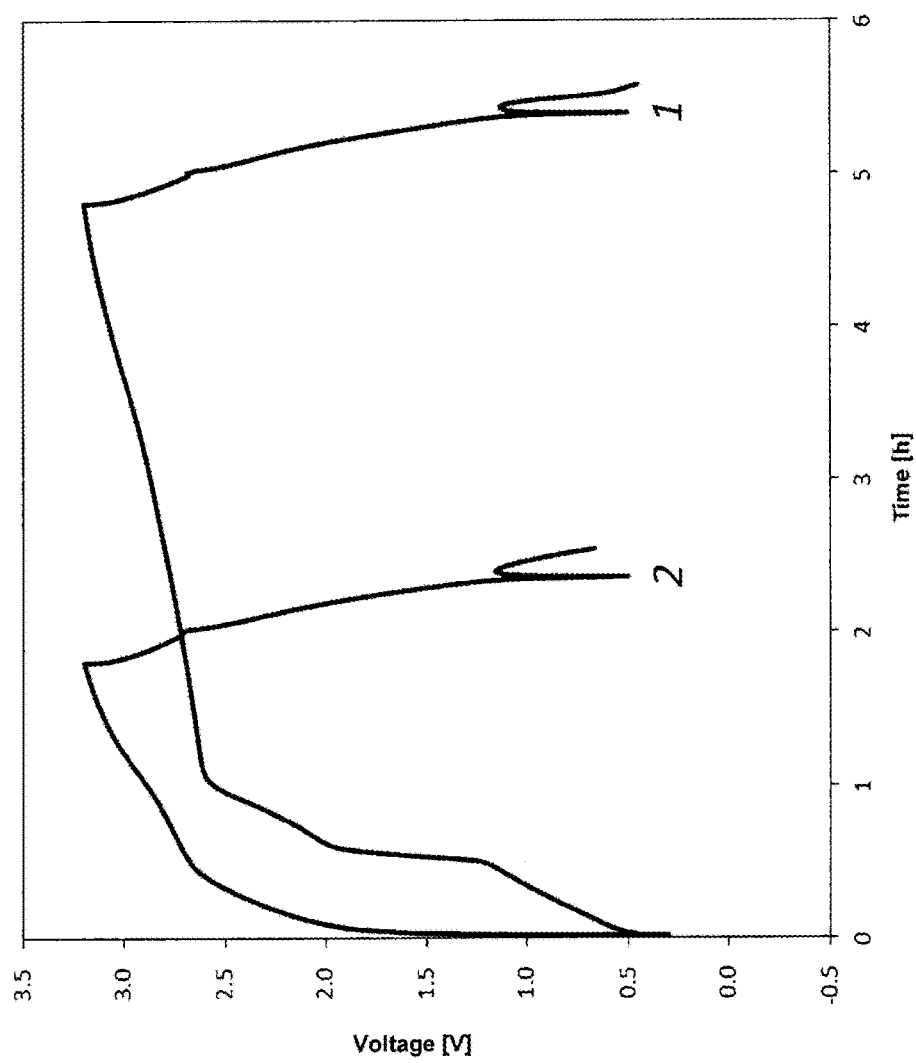
FIG. 14 shows the first two charge-discharge voltage profiles of a Mg battery according to one embodiment of the present invention as a function of time. This test was done after the first three formation cycles shown in FIG. 12. The electrolyte is 0.75M Mg monocarborane in TG.

FIG. 14 shows the first two charge-discharge voltage profiles of Test Battery 6 as a function of time. This test was done after the first three formation cycles shown in FIG. 12.

Figure 15:
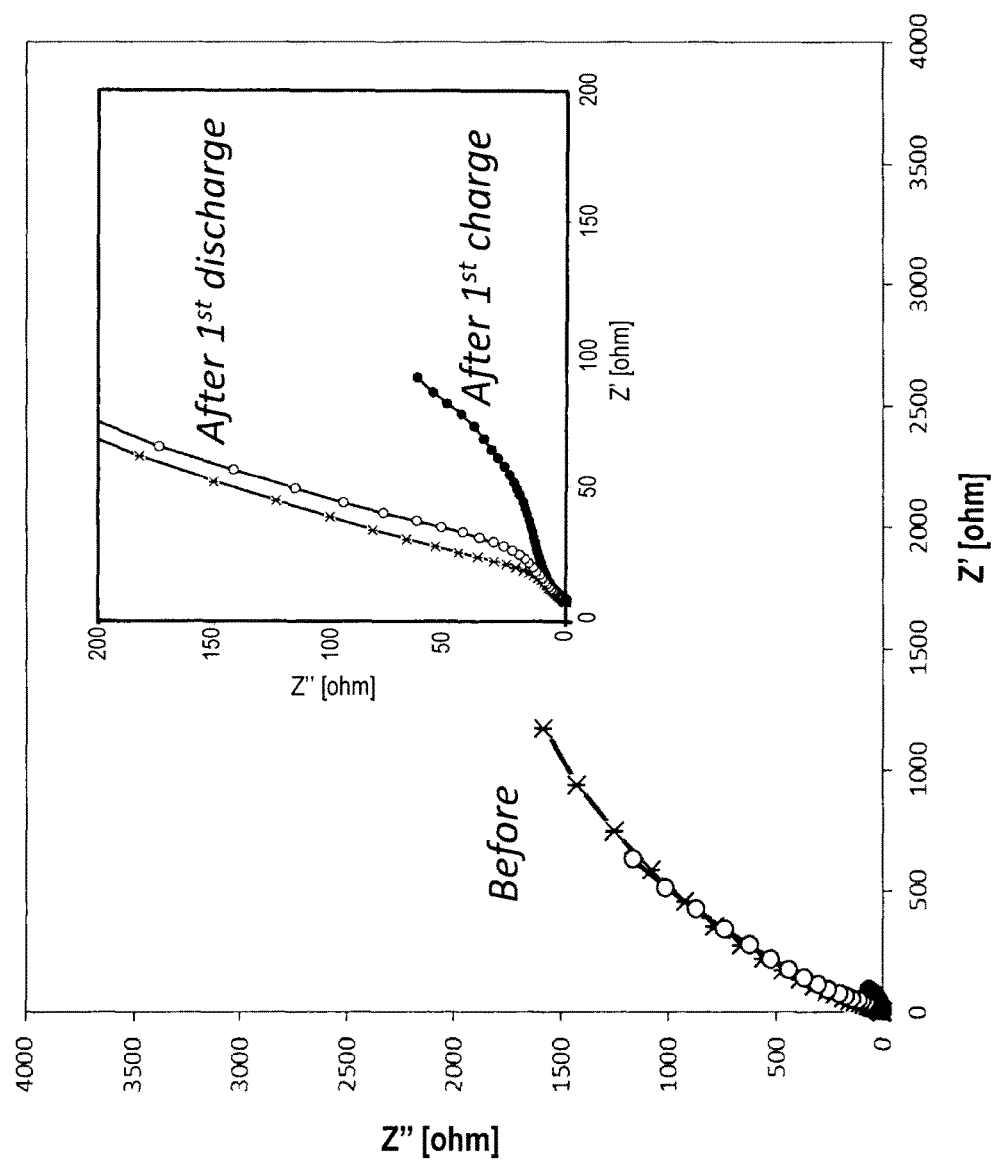
FIG. 15 shows Nyquist plots of a Mg battery according to one embodiment of the present invention before testing, after initial charging and subsequent discharging. The electrolyte is 0.75M Mg monocarborane in TG.

FIG. 15 shows Nyquist plots of Test Battery 6 before testing, after initial charging and subsequent discharging.

Figure 16:
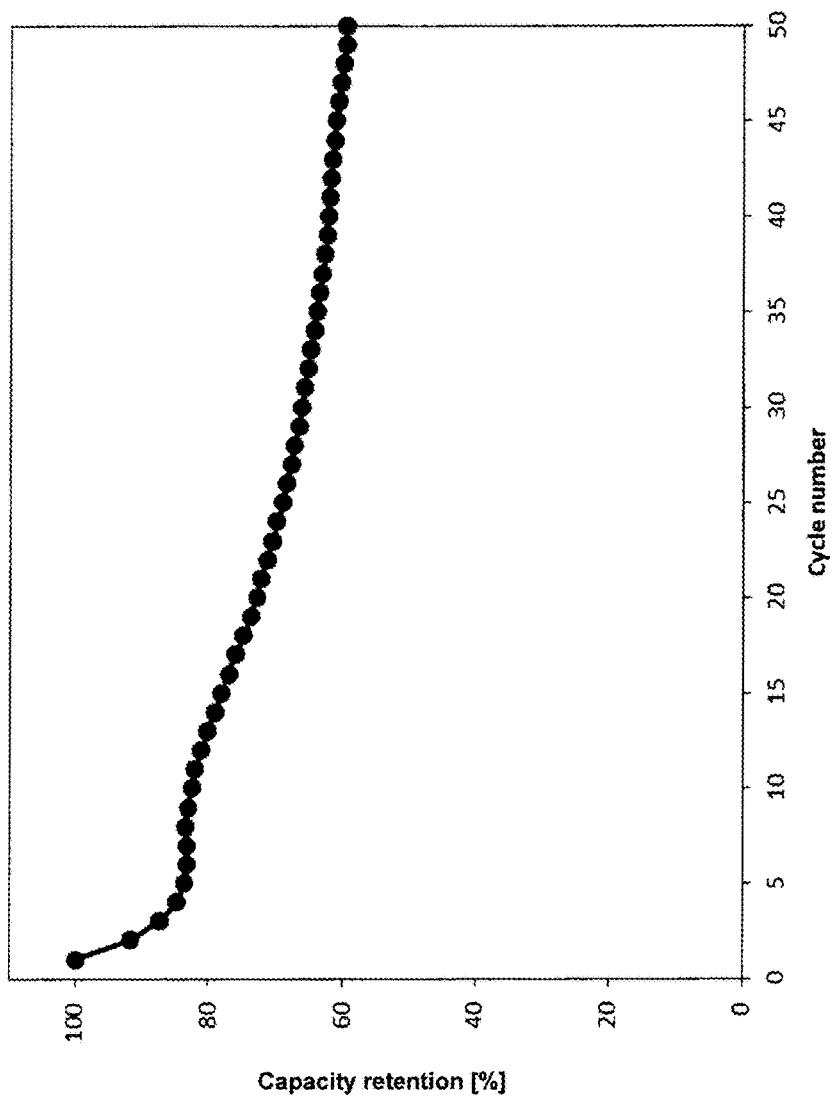
FIG. 16 shows the capacity retention of the discharge capacity of a Mg battery according to one embodiment of the present invention as a function of cycle number. The electrolyte is 0.75M Mg monocarborane in TG. This test was done after the first three formation cycles shown in FIG. 12.

FIG. 16 shows the capacity retention of the discharge capacity of Test Battery 6 as a function of cycle number. This test was done after the first three formation cycles shown in FIG. 12.

To eliminate the impact of low voltage plateau and irreversible capacity, the formation cycle prior to the battery cycling was applied three times. As shown in FIGS. 12 and 13, the impedance had a good response to formation and removal Mg metal in the system. After that, the battery was repeatedly cycled over 50 times as shown in FIGS. 14 and 16. FIG. 15 demonstrated that lower impedance was observed during charging, and then during discharging it went back to the original state, indicating that the anode/electrolyte interface could be successfully and repeatedly rebuilt.

Additional advantages and other features of the present invention will become apparent to those having ordinary skill in the art upon examination of the present disclosure or may be learned from the practice of the present invention. The advantages of the present invention may be realized and obtained as particularly pointed out in the appended claims. As will be realized, the present invention is capable of other and different embodiments, and its several details are capable of modifications in various obvious respects, all without departing from the present invention. In this regard, the description herein is to be understood as illustrative in nature, and not as restrictive.

The invention claimed is:

1. A method for production of a magnesium battery, comprising:
   construction of a cell comprising an uncoated current collector anode, an electrolyte system comprising a non-aqueous solvent and a magnesium salt soluble in the non-aqueous solvent, and a cathode; and
   charging the cell to electrodeposit magnesium metal unto the uncoated current collector to form an anode having magnesium metal as the active material and obtain a secondary magnesium battery comprising the formed anode, the cathode and the electrolyte system.

2. The method of claim 1, wherein the electrolyte system comprises one selected from the group consisting of a borohydride-based electrolyte, a Grignard-based electrolyte and an ionic liquid based electrolyte.

3. The method of claim 1, wherein the electrolyte system comprises a borohydride based electrolyte and the electrolyte salt is Mg monocarborane.

4. The method of claim 1, wherein the Mg deposition is conducted with more than one charge cycles.

5. The method of claim 1, wherein the anode current collector comprises one selected from the group consisting of carbon, carbon paper, carbon cloth, a metal, a noble metal mesh and a metal foil.

6. The method according to claim 1 wherein a content of Mg ion in the electrolyte is from 0.05 to 2.0 M.

7. A rechargeable magnesium battery, obtained according to the method of claim 1, comprising:
   an anode current collector of a material selected from the group consisting of carbon, carbon paper carbon cloth, a metal, a noble metal mesh and a metal foil;
   an electrolyte system selected from the group consisting of a borohydride-based electrolyte, a Grignard-based electrolyte and an ionic liquid based electrolyte;
   wherein a content of Me ion in the electrolyte is from 0.05 to 2.0 M; and
   wherein upon completion of the charge to electrodeposit the Mg on the anode current collector, no impedance is present at an anode/electrolyte interface.

8. The rechargeable magnesium battery of claim 7, wherein the electrolyte system comprises one selected from the group consisting of a borohydride-based electrolyte, a Grignard-based electrolyte and an ionic liquid based electrolyte.

9. The rechargeable magnesium battery of claim 7, wherein the electrolyte system comprises a borohydride based electrolyte and the electrolyte salt is Mg monocarborane.

10. The rechargeable magnesium battery of claim 7, wherein the anode current collector comprises one selected from the group consisting of carbon, carbon paper, carbon cloth, a metal, a noble metal mesh and a metal foil.

11. The rechargeable magnesium battery of claim 7, wherein a content of Mg ion in the electrolyte is from 0.05 to 2.0 M.

12. The rechargeable magnesium battery of claim 7, wherein the cathode comprises a nitroxyl radical compound.

13. The rechargeable magnesium battery of claim 7, wherein the cathode comprises 2,2,6,6-tetramethylpiperidine 1-oxyl (TEMPO).

14. A method for production of a magnesium battery, comprising:
   construction of a cell comprising an uncoated current collector anode, an electrolyte chamber having an inlet and outlet for addition and removal of electrolyte solution; a cathode; and an electrolyte system comprising a non-aqueous solvent and a magnesium salt soluble in the non-aqueous solvent in the electrolyte chamber;
   charging the cell to electrodeposit magnesium metal unto the uncoated current collector to form an anode having magnesium metal as the active material and obtain a secondary magnesium battery comprising the formed anode, the cathode and the electrolyte system.

15. The method of claim 14, further comprising after the cell charging, removal of the electrolyte solution with a depleted Mg ion content from the charged cell and replacement of the electrolyte solution with an electrolyte solution having a Mg ion content of from 0.05 to 2.0 M.

16. A rechargeable magnesium battery obtained by the method of claim 14, comprising:

an anode current collector of a material selected from the group consisting of carbon, carbon paper, carbon cloth, a metal, a noble metal mesh and a metal foil;

an electrolyte chamber having an inlet and outlet for addition and removal of electrolyte solution;

an electrolyte system selected from the group consisting of a borohydride-based electrolyte, a Grignard-based electrolyte and an ionic liquid based electrolyte;

wherein a content of Mg ion in the electrolyte is from 0.05 to 2.0 M; and wherein upon completion of the charge to electrodeposit the Mg on the anode current collector, no impedance is present at an anode/electrolyte interface.

17. The rechargeable magnesium battery of claim 16, wherein the electrolyte system comprises one selected from the group consisting of a borohydride-based electrolyte, a Grignard-based electrolyte and an ionic liquid based electrolyte.

18. The rechargeable magnesium battery of claim 16, wherein the electrolyte system comprises a borohydride based electrolyte and the electrolyte salt is Mg monocarborane.

19. The rechargeable magnesium battery of claim 16, wherein the anode current collector comprises one selected from the group consisting of carbon, carbon paper, carbon cloth, a metal, a noble metal mesh and a metal foil.

20. The rechargeable magnesium battery of claim 16, wherein a content of Mg ion in the electrolyte of the constructed cell prior to charging is from 0.05 to 2.0 M.

21. The rechargeable magnesium battery of claim 16, wherein the cathode comprises a nitroxyl radical compound.

22. The rechargeable magnesium battery of claim 16, wherein the cathode comprises 2,2,6,6-tetramethylpiperidine 1-oxyl (TEMPO).

23. The rechargeable magnesium battery of claim 16, wherein the inlet and outlet are connected in a flow-through system to an electrolyte reservoir.

* * * * *